(12) United States Patent
Frey

(10) Patent No.: US 7,871,029 B2
(45) Date of Patent: Jan. 18, 2011

(54) BALE PROCESSOR HAVING IMPROVED SHREDDING ROLLER

(75) Inventor: Oscar Frey, Listowel (CA)

(73) Assignee: Tube-Line Manufacturing Ltd., Listowel, Ontario ( * ) Notice: Subject to any disclaimer, the term of this patent is extended or adjusted under 35 U.S.C. 154(b) by 0 days.

(21) Appl. No.: 12/420,437

(22) Filed: Apr. 8, 2009

(65) Prior Publication Data

US 2010/0258662 A1  Oct. 14, 2010

(51) Int. Cl.
B02C 13/00 (2006.01)
B02C 23/02 (2006.01)

(52) U.S. Cl. .................. 241/186.5; 241/188.1; 241/247

(58) Field of Classification Search ............. 241/186.5, 241/605, 188.1, 247
See application file for complete search history.

(56) References Cited

U.S. PATENT DOCUMENTS

| | | | |
|---|---|---|---|
| 1,771,163 A * | 7/1930 | Crites ...................... 241/186.4 |
| 2,978,097 A * | 4/1961 | Blanshine ................... 198/608 |
| 4,084,751 A * | 4/1978 | Galis ........................... 241/25 |
| 4,428,537 A * | 1/1984 | von der Heide ....... 241/101.742 |
| 4,449,672 A | 5/1984 | Morlock et al. |
| 4,506,990 A * | 3/1985 | Neier et al. ................. 366/299 |
| 4,779,810 A | 10/1988 | Frey |
| 5,356,054 A * | 10/1994 | Loppoli et al. .............. 222/610 |
| 5,439,182 A * | 8/1995 | Sgariboldi ............... 241/260.1 |
| 5,573,190 A * | 11/1996 | Goossen ....................... 241/27 |
| 5,601,241 A * | 2/1997 | Brewster ................ 241/101.76 |
| 5,622,323 A * | 4/1997 | Krueger et al. ......... 241/101.76 |
| 5,738,287 A | 4/1998 | Vanderberg |
| 5,813,616 A | 9/1998 | Vandervalk |
| 5,921,480 A * | 7/1999 | Wenzel ......................... 241/29 |
| 5,967,433 A * | 10/1999 | O'Neill et al. ............ 241/101.2 |
| 6,007,008 A * | 12/1999 | Neier ....................... 241/101.8 |
| 6,029,919 A * | 2/2000 | Rousseau ................. 241/101.2 |
| 6,149,083 A * | 11/2000 | McFarland .................. 241/82.5 |
| 6,171,047 B1 | 1/2001 | Vandervalk |
| 6,375,104 B1 * | 4/2002 | Hruska ..................... 241/189.1 |
| 6,827,304 B2 * | 12/2004 | Rousseau ...................... 241/73 |
| 6,923,393 B1 * | 8/2005 | Neier et al. .................... 241/30 |
| 7,028,932 B2 * | 4/2006 | Lucas et al. .............. 241/101.8 |

* cited by examiner

Primary Examiner—Bena Miller
(74) Attorney, Agent, or Firm—Bereskin Parr LLP/S.E.N.C.R.L., s.r.l.

(57) ABSTRACT

A bale processor, having a support surface for supporting a bale of crop material, a shredding roller positioned at one end of the support surface, the shredding roller having an elongate roller body, the roller body configured to rotate about an axis of rotation, and a feed mechanism positioned on the support surface, the feed mechanism configured for urging the bale towards the shredding roller. The shredding roller includes at least one separating section having at least one impacting member that protrudes outwardly from the elongate roller body, the at least one impacting member configured to impact the bale when the roller body rotates so as to separate the crop material therefrom. The shredding roller also includes at least one conveying section configured to engage a portion of the bale and to direct that portion towards the separating section in a longitudinal direction aligned with the axis of rotation of the roller body.

20 Claims, 6 Drawing Sheets

BALE PROCESSOR HAVING IMPROVED SHREDDING ROLLER

TECHNICAL FIELD

The embodiments disclosed herein relate to bale processors for farming and other applications, and in particular to bale processors having shredding rollers for separating crop material from bales.

INTRODUCTION

Crop materials such as hay, straw and silage are commonly stored as bales of various shapes and sizes. For example, crop materials may be stored as square or round bales that can be several feet wide.

When the crop materials are to be used, for example for bedding or feeding, they are separated from the bales by shredding or breaking the bales apart. This can be done manually, however, it is a time consuming and difficult task. Accordingly, powered bale processors have been developed.

For example, U.S. Pat. No. 5,738,287 describes a bale processor where bales are separated by the action of a rotatable member that engages the bale. The rotatable member includes a central shaft and a number of spaced apart fingers that extend out from the shaft to engage the bale during rotation. The separator acts substantially without chopping the bale materials and can be used to separate and spread the bale materials in one operation. This bale processor can be mounted on a trailer for towing.

Similarly, U.S. Pat. No. 5,813,616 describes a bale processor for separating and selectively chopping baled crop materials. A moving barrier advances a bale into a separator that includes a rotating elongate tube provided with hinged finger-like flails. The flails remove material from the bale and discharge it in a directed manner. The material may be cut to differing sizes as desired by retractable knives positioned in the discharge chute. Alternatively, material can be separated without chopping. A second freely rotating blade separates material from the upper portion of the bale directing it into the path of the separator tube. The processor may be used to distribute crop material over a wide area and can be mounted on a trailer and towed by a tractor. The apparatus can accommodate square or round bales.

It has been discovered that known bale processors tend not to evenly grab and/or separate the bales of crop material. In particular, each bale tends to be made up of multiple discrete sections or "flakes" that are held together. With known bale processors, the rotating members tend to grab an entire "flake" of crop material at the same time, as opposed to smoothly progressing through the bale. This tends to result in jerky or uneven feed rates (e.g. a high feed rate when an entire flake is grabbed, followed by a low feed rate until the bale moves close enough that the next flake can be grabbed).

Accordingly, there is a need for improved bale processors that provide for more even feeding of bale material.

SUMMARY

According to one aspect of the invention, there is provide a bale processor, comprising a support surface for supporting a bale of crop material, a shredding roller positioned at one end of the support surface, the shredding roller having an elongate roller body, the roller body configured to rotate about an axis of rotation, and a feed mechanism positioned on the support surface, the feed mechanism configured for urging the bale towards the shredding roller, wherein the shredding roller includes at least one separating section having at least one impacting member that protrudes outwardly from the elongate roller body, the at least one impacting member configured to impact the bale when the roller body rotates so as to separate the crop material therefrom, and at least one conveying section configured to engage a portion of the bale and to direct that portion towards the separating section in a longitudinal direction aligned with the axis of rotation of the roller body.

The at least one impacting member may comprise a plurality of flails, each flail pivotally coupled to the elongate roller body.

Each conveying section may includes at least one conveying member. Each conveying member may be auger-shaped having at least one generally helical flight that wraps around the roller body. Each helical flight may be spaced apart from the roller body so as to define a space therebetween. Alternatively, each helical flight may be generally continuous with the roller body so that no spaces are defined therebetween.

In some embodiments, the at least one conveying section includes a first conveying section located at a first end of the shredding roller and a second conveying section located at a second end of the shredding roller, the separating section is located between the first and second conveying sections, and the first and second conveying sections are configured to convey bale material longitudinally inwardly towards the separating section.

Each conveying section may be at least partially enclosed by a shroud generally opposite the feed mechanism, each shroud having an arcuate shape corresponding to the outer profile of each conveying section.

The feed mechanism may comprise a movable barrier that extends upwardly from the support surface.

The bale processor may further comprise a discharge chute aligned with the at least one separating section, the discharge chute configured to receive the separated crop material from the shredding roller and to direct the separated crop material.

The bale processor may further comprise end portions that extend outwardly from the opposite ends of the shredding roller. The end portions may be tapered.

The bale processor may further comprise at least one paddle roller configured to direct an upper portion of each bale downwardly towards the shredding roller.

According to another aspect of the invention, there is provided a shredding roller for use with a bale processor, comprising an elongate roller body configured to rotate about an axis of rotation, at least one separating section having at least one impacting member that extends outwardly from the roller body and being configured to impact a bale of crop material when the roller body is rotated so as to separate the crop material therefrom, and at least one conveying section configured to engage a portion of the bale and to direct that portion towards the separating section in a longitudinal direction aligned with the axis of rotation of the roller body.

BRIEF DESCRIPTION OF THE DRAWINGS

The drawings included herewith are for illustrating various examples of methods and apparatus of the present specification and are not intended to limit the scope of what is taught in any way. In the drawings.

DETAILED DESCRIPTION

Figure 1:
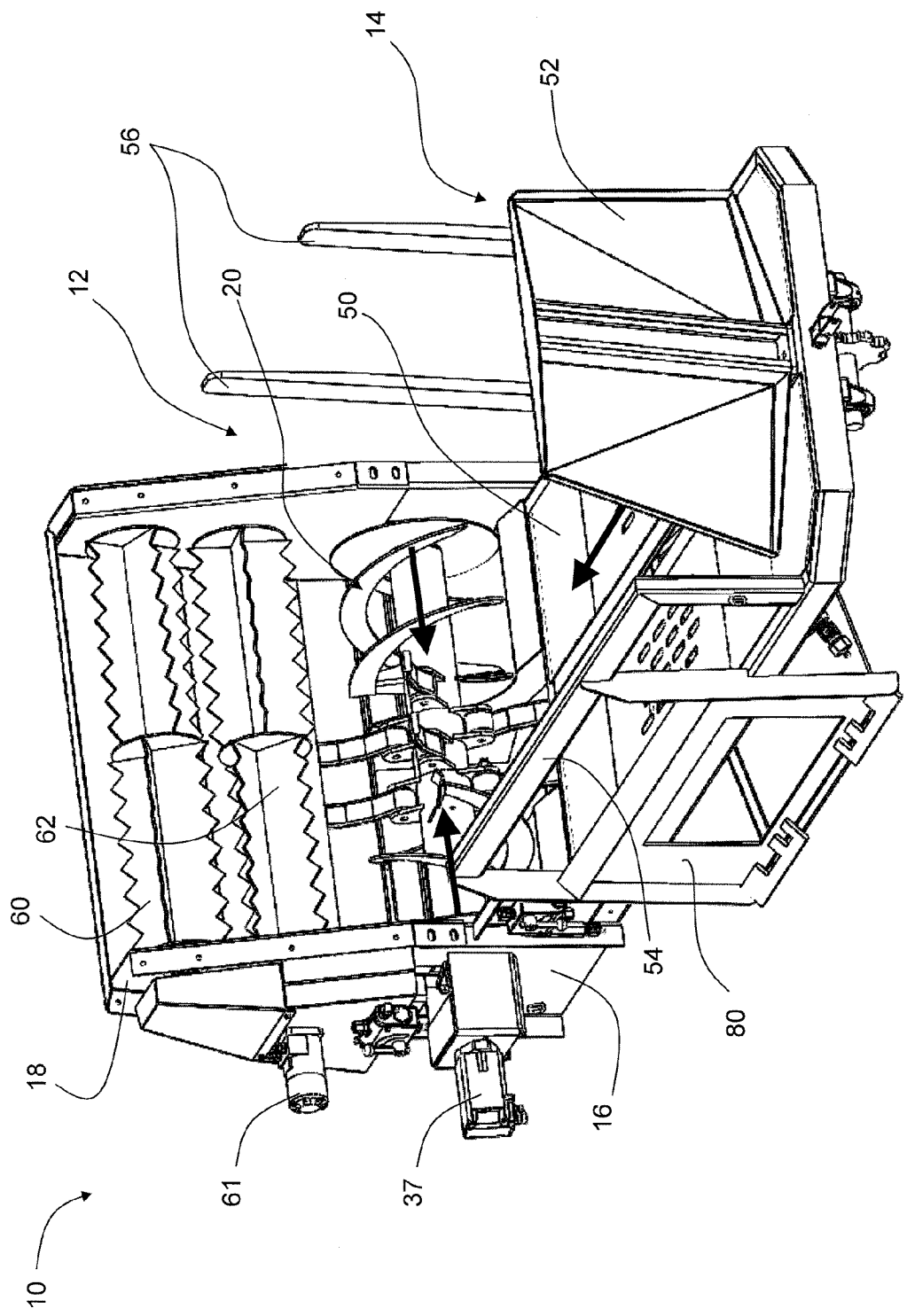
FIG. 1 is a front perspective view of a bale processor having a shredding roller according to one embodiment.
Figure 6:
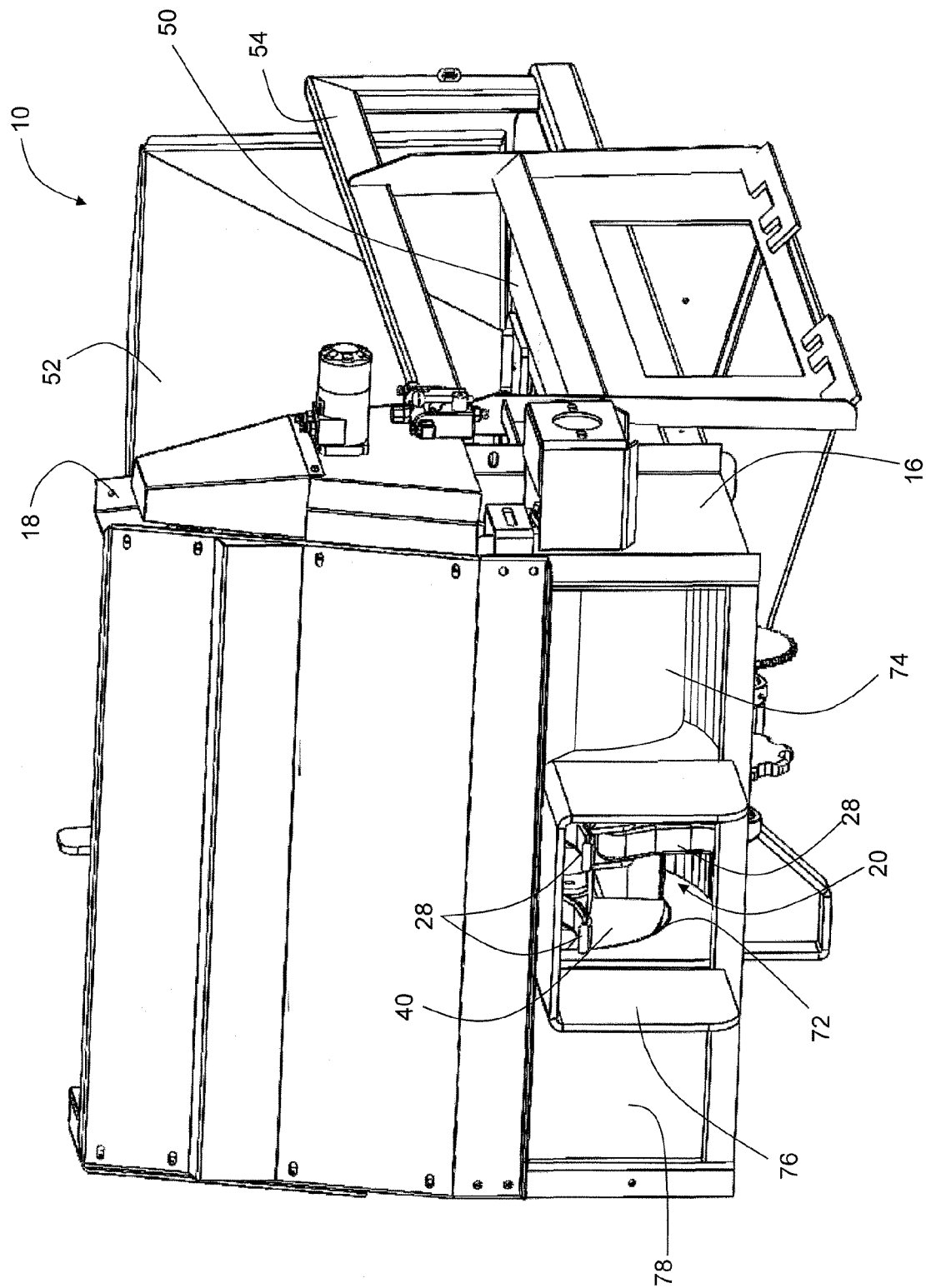
FIG. 6 is a rear perspective view of the bale processor of FIG. 1.

Turning now to FIGS. 1 and 6, illustrated therein is a bale processor 10 for separating bales of crop material (e.g. hay, straw, silage etc.) according to one embodiment of the invention. The bale processor 10 generally includes a separator portion 12 configured for separating the crop material from the bales, and a feed portion 14 for receiving the bales of crop material (e.g. square or round bales) and for supplying the bales to the separator portion 12.

The separator portion 12 has a lower frame portion 16 and an upper frame portion 18 generally above the lower frame portion 18. Mounted within the lower frame portion 16 is a shredding roller 20 according to one embodiment. As will be explained in detail below, the shredding roller 20 is configured to rotate when the bale processor 10 is in use so as to separate the crop material from the bales and discharge the separated material through a discharge chute.

Figure 2:
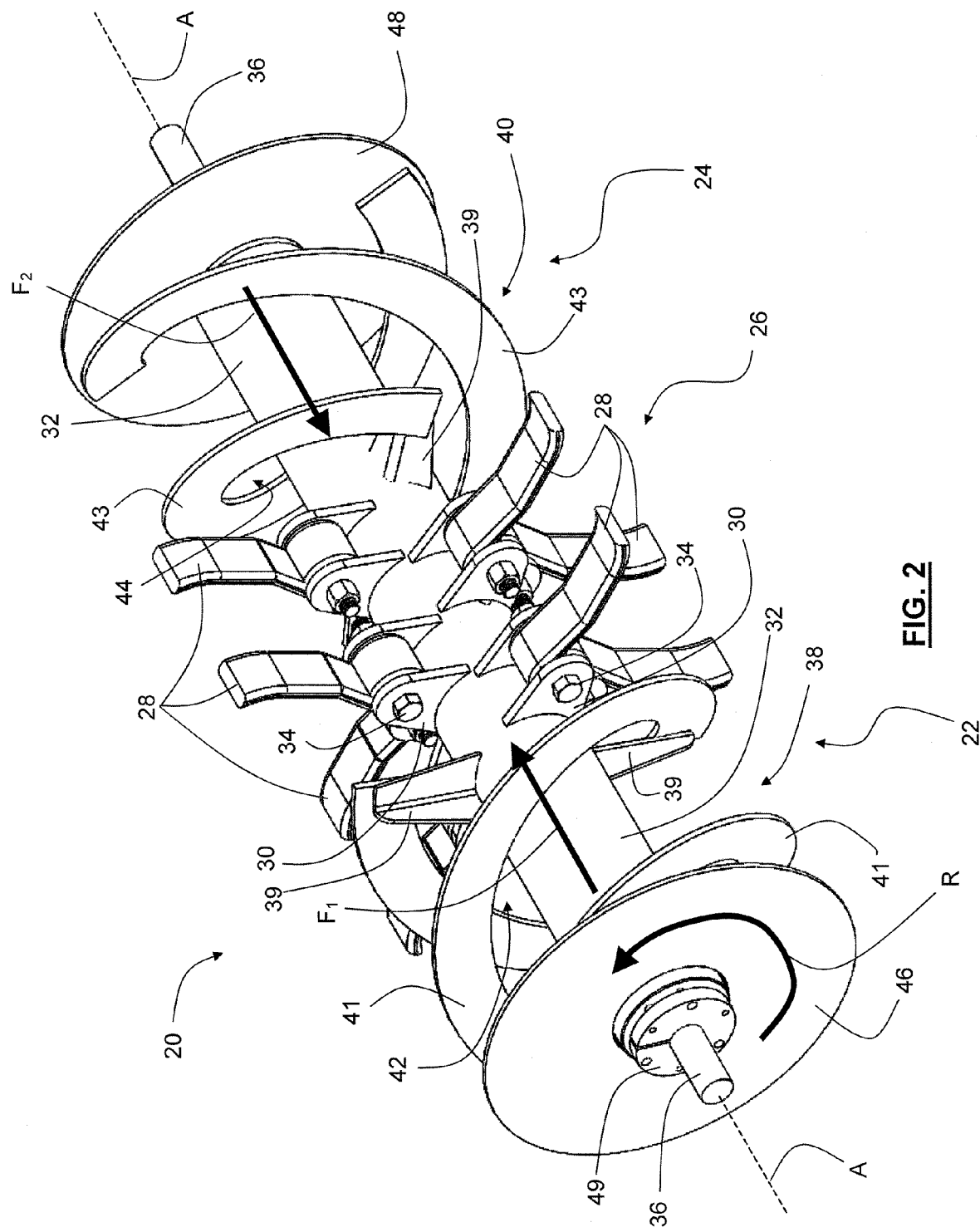
FIG. 2 is a close-up perspective view of the shredding roller shown in FIG. 1.
Figure 3:
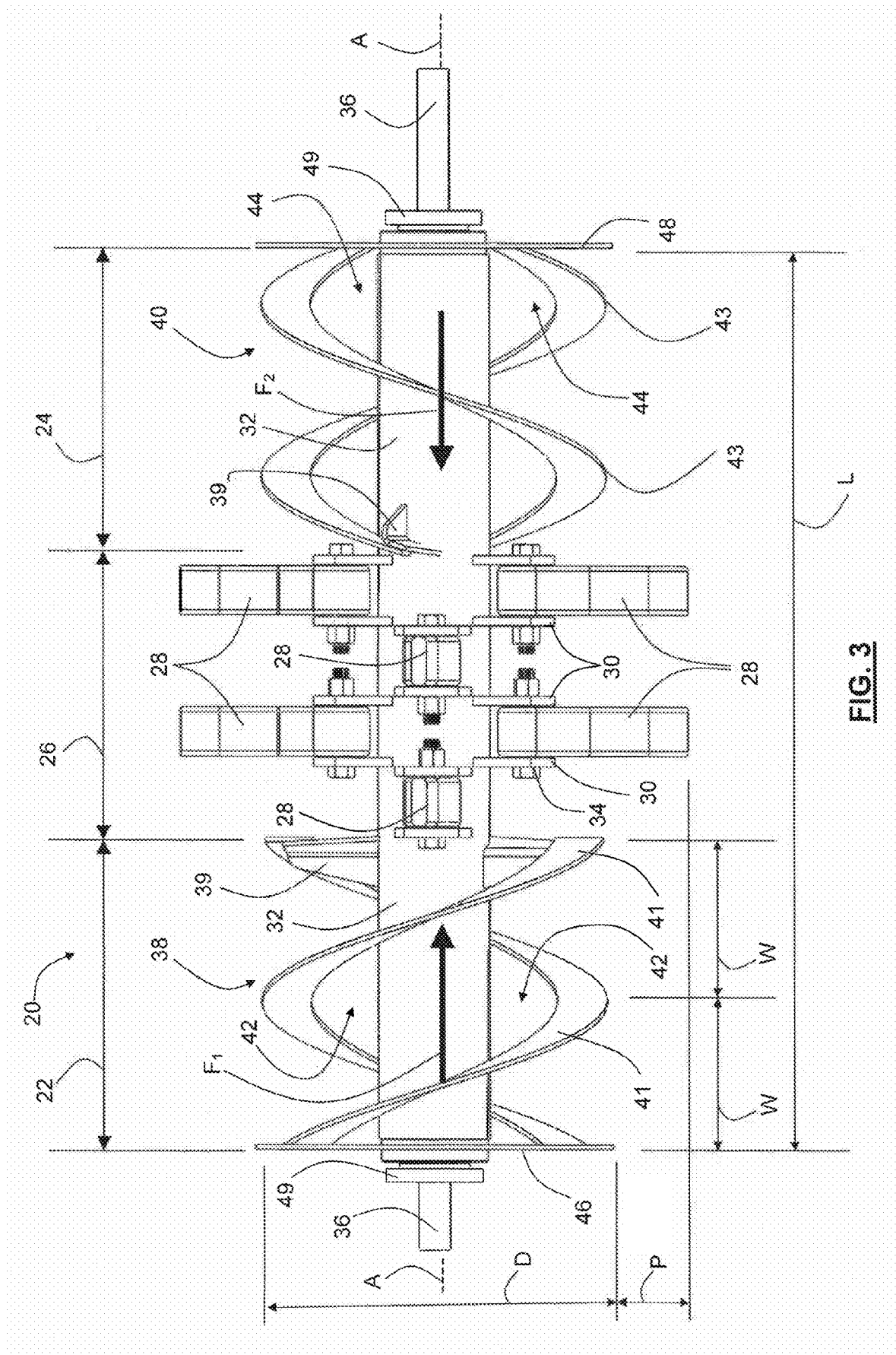
FIG. 3 is a side view of the shredding roller of FIG. 2.

As shown in FIGS. 2 and 3, the shredding roller 20 generally includes a first conveying section 22 located at a first end of the shredding roller 20, a second conveying section 24 located at a second end of the shredding roller 20 opposite the first end, and a separating section 26 located between the first and second conveying sections 22, 24. As will be described in further detail below, the conveying sections 22, 24 are configured to engage portions of the incoming bale and convey or direct those portions longitudinally inwardly towards the separating section 26 where they can be separated. This tends to smooth out the feed rate of bale material passing through the shredding roller 20.

As shown, the separating section 26 includes a plurality of impacting members (shown here as flails 28) that extend outwardly from an elongate roller body 32. In this example, the roller body 32 is a cylindrical tube roller tube. However, it will be appreciated that the roller body 32 may have other shapes (e.g. the roller body 32 may be a rectangular or square tube member).

Each flail 28 may be pivotally coupled to a clevis 30 mounted onto the roller body 32 using fasteners 34 (e.g. bolts, shear pins, etc.). This allows the flail 28 to pivot when engaging the bale so that the flail 28 impacts the bale with a desired amount of force that is sufficient to cause separation of the crop material from the bale without overloading the shredding roller 20 and generally without damaging the crop material.

The quantity, size and arrangement of flails 28 within the separating section 26 may be varied according to the particular application, and may depend on the size of the bale and the type of crop material being processed. For example, as shown a total of eight flails 28 are coupled to the roller body 32, arranged in four pairs that are equally spaced about the circumference of the roller body 32, with adjacent pairs being longitudinally offset by about the width of a flail 28. However, various other quantities, arrangements and patterns of flails 28 may be used.

In some embodiments, the flails 28 may be modified and/or replaced with other impacting members suitably configured for separating bales of crop material. For example, in some embodiments one or more impacting members may be rigidly coupled to and extend outwardly from the roller body 32 so that they do not pivot. In other embodiments, the flails 28 may have other shapes or sizes (e.g. different end or head portions), or the impacting members could include one or more knives.

The roller body 32 is rigidly coupled to a shaft 36 (e.g. using coupling members 49), which in turn is coupled to a drive mechanism 37. During use of the shredding roller 20, the drive mechanism 37 rotates roller body 32 about a longitudinal axis A at a speed selected so as to cause the flails 28 to impart the desired force onto the bales to separate the crop material therefrom.

In some embodiments, the drive mechanism 37 may rotate the shredding roller 20 at speeds of up to 1000 revolutions per minute (rpm). In other embodiments, the shredding roller 20 may be rotated as speeds of up to 1200 rpm. In yet other embodiments, the shredding roller 20 may be rotated at speeds of up to 1500 rpm, or at even greater speeds. In some embodiments, the speed of rotation may be varied during use (e.g. by an operator), for example to control the rate of crop material being discharged from the bale processor 10.

In some embodiments, the drive mechanism 37 may be a hydraulic drive powered by a hydraulic system. In other embodiments, the drive mechanism 37 may be driven by a power take-off (PTO) drive provided on a working vehicle (e.g. a tractor). In yet other embodiments, the drive mechanism 37 may be an electric motor.

As shown, the shredding roller 20 may include end plates 46 and 48 at opposite ends of the roller body 32. The end plates 46, 48 extend radially outwardly from the roller body 32 and may help inhibit bale material from spilling longitudinally outwardly from the conveying sections 22, 24 during use.

As briefly described above, the conveying sections 22, 24 are generally configured to convey portions of the bale longitudinally (e.g. generally aligned with the axis of rotation A of the shredding roller 20) inwardly towards the separating section 26.

To this end, each conveying section 22, 24 includes a conveying member configured to engage and direct bale material. For example, the first conveying section 22 includes a conveying member 38 that is sized and shaped to move bale material in a first longitudinal direction $F_1$ towards the separating section 26. Similarly, the second conveying section 22 includes a conveying member 40 that is sized and shaped to move bale material in a second longitudinal direction $F_2$ (generally opposite the first longitudinal direction $F_1$) towards the separating section 26.

In this example, each conveying member 38, 40 is auger-shaped, and has two helical flights 41, 43 that wrap around the roller body 32. As evident by inspection of FIG. 2, the helical flights 41, 43 are configured so that when the shredding roller 20 is rotated in a first angular direction R, they will direct bale material longitudinally inwardly towards the separating section 26.

Each helical flight 41, 43 has a pitch width W selected such that each helical flight 41, 43 completes one full revolution about the roller body 32 (generally between the end plates 46, 48 and the separating section 26). In some embodiments, the pitch width W of the helical flight 41, 43 may be changed to accommodate different sizes of bales and/or different types of crop material. For example, each helical flight 41, 43 may have a pitch width W selected so as to wrap around the roller body 32 two or more times, or to have less than one complete revolution.

As shown, each helical flight 41, 43 may be spaced apart from the roller body 32 (such as by using arm members 39) so as to define open portions or spaces 42, 44 between the helical flights 41, 43 and the roller body 32. These spaces 42, 44 may help to reduce pressure on the helical flights 41, 43 during use by allowing separated crop material to move outwardly (e.g. away from the separating section 26) in the event of a clog, jam, or another problem encountered when operating the shredding roller 20. This may inhibit excess wear or damage to the helical flights 41, 43.

In some embodiments, the conveying members 38, 40 may not be auger-shaped, but may instead include knives, blades, or generally any other suitably selected and arranged members protruding outwardly from the roller body 32 that are shaped to convey the bale material longitudinally towards the separating section 26.

As shown, the shredding roller 20 has two opposing conveying sections 22, 24 on opposite ends thereof. This may help to balance or reduce the forces (e.g. torque) acting on the shredding roller 20, and may help to ensure a more even feed of bale material to the separating section 26. However, the shredding roller 20 may be provided with any number of conveying sections and/or separating sections as desired.

Furthermore, although the shredding roller 20 is shown having a separating section 26 in between the first and second conveying sections 22, 24, various other configurations are possible. For example, a separating section may be located at one end of a shredding roller, with a conveying section located at the other end of the shredding roller and being configured to direct bale material towards that separating section.

As shown, the shredding roller 20 generally has a length L that is selected so as to span the width of the incoming bales, with the width of each individual section 22, 24, 26 is less than the width of the bales. Accordingly, when a bale engages the shredding roller 20, at least a portion of the bale will normally be engaged by at least one of the conveying sections 22, 24, and by the separating section 26.

In some embodiments, each section 22, 24, 26 may be substantially similar in length. For example, as shown each section 22, 24, 26 has approximately the same length generally equal to ⅓ of the length L of the shredding roller 20. It will be understood however that the lengths of each section 22, 24, 26 could be varied, and may not be the same.

In some embodiments the length L of the shredding roller 20 may be at least three feet to accommodate bales that are three feet wide. In other embodiments, the length L of the shredding roller 20 may be at least four feet. In yet other embodiments, the length L of the shredding roller 20 may be at least five feet or more.

As shown, each conveying section 22, 24 generally has a width or diameter D that is greater than the width of the roller body 32. In some embodiments, the diameter D may be between ten inches and twenty inches. In other embodiments, the diameter D may be less than ten inches. In other embodiments, the diameter D may be greater than twenty inches.

In some embodiments, the flails 28 extend outwardly from the roller body 32 beyond the diameter D of the conveying sections 22, 24. Accordingly, the flails 28 will tend to engage an incoming bale before the bale contacts the conveying sections 22, 24. For example, as shown in FIG. 3, the flails 28 on the shredding roller 20 may extend beyond the diameter D by a distance P.

In some embodiments, the distance P may be between one inch and three inches. In other embodiments, the distance P may be less than one inch. In other embodiments, the distance P may be greater than three inches.

In some embodiments, a row retractable cutting knives (not shown) may be provided near the shredding roller 20 (e.g. either before or after the bale engages the shredding roller 20) so that the crop material will engage the row of cutting knives during use as will be understood by a person skilled in the art. This may be useful to selectively cut the crop material as desired for some applications (e.g. where the bale processor 10 is used to prepare hay for feeding).

Figure 4:
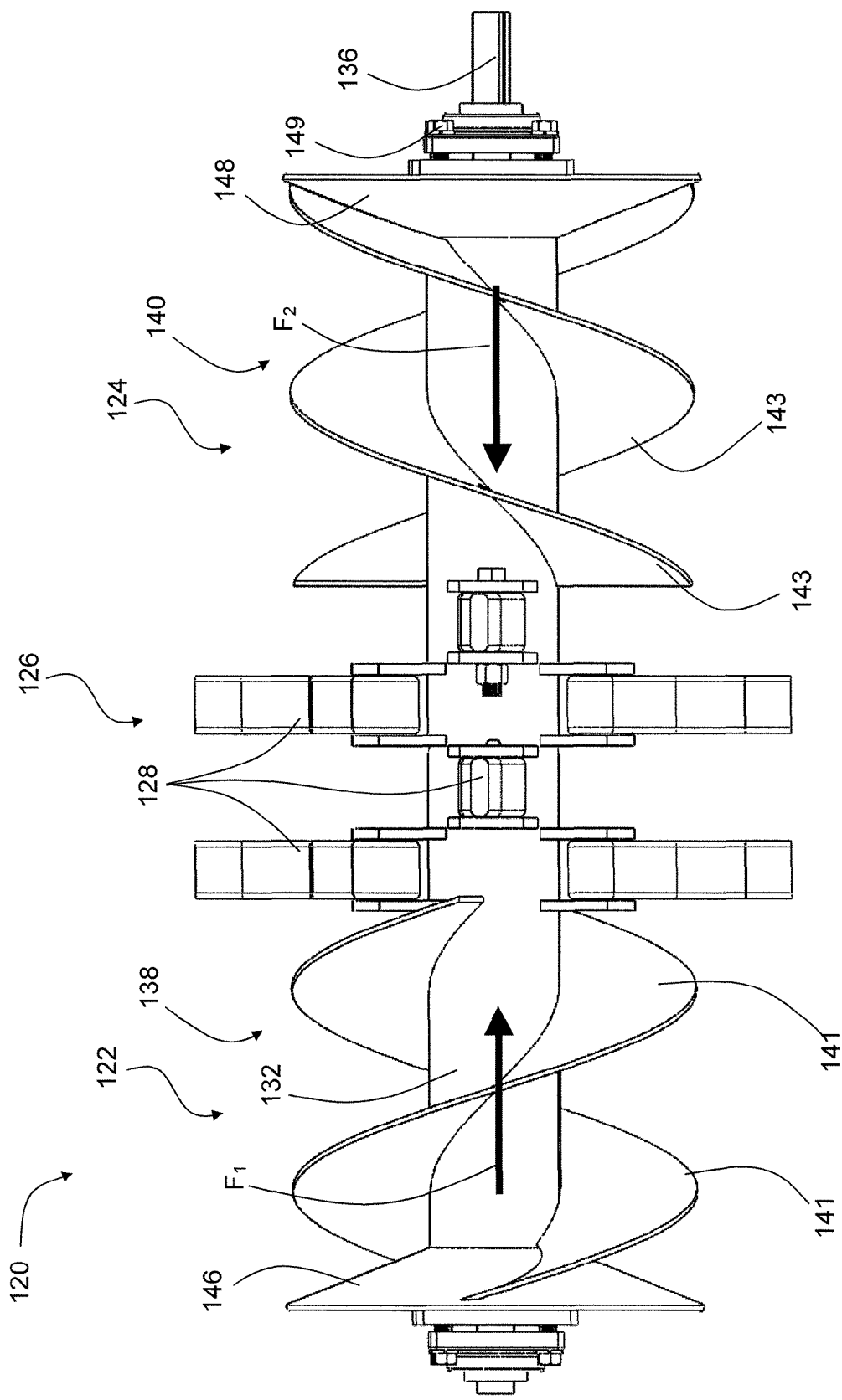
FIG. 4 is a side view of a shredding roller according to another embodiment.
Figure 5:
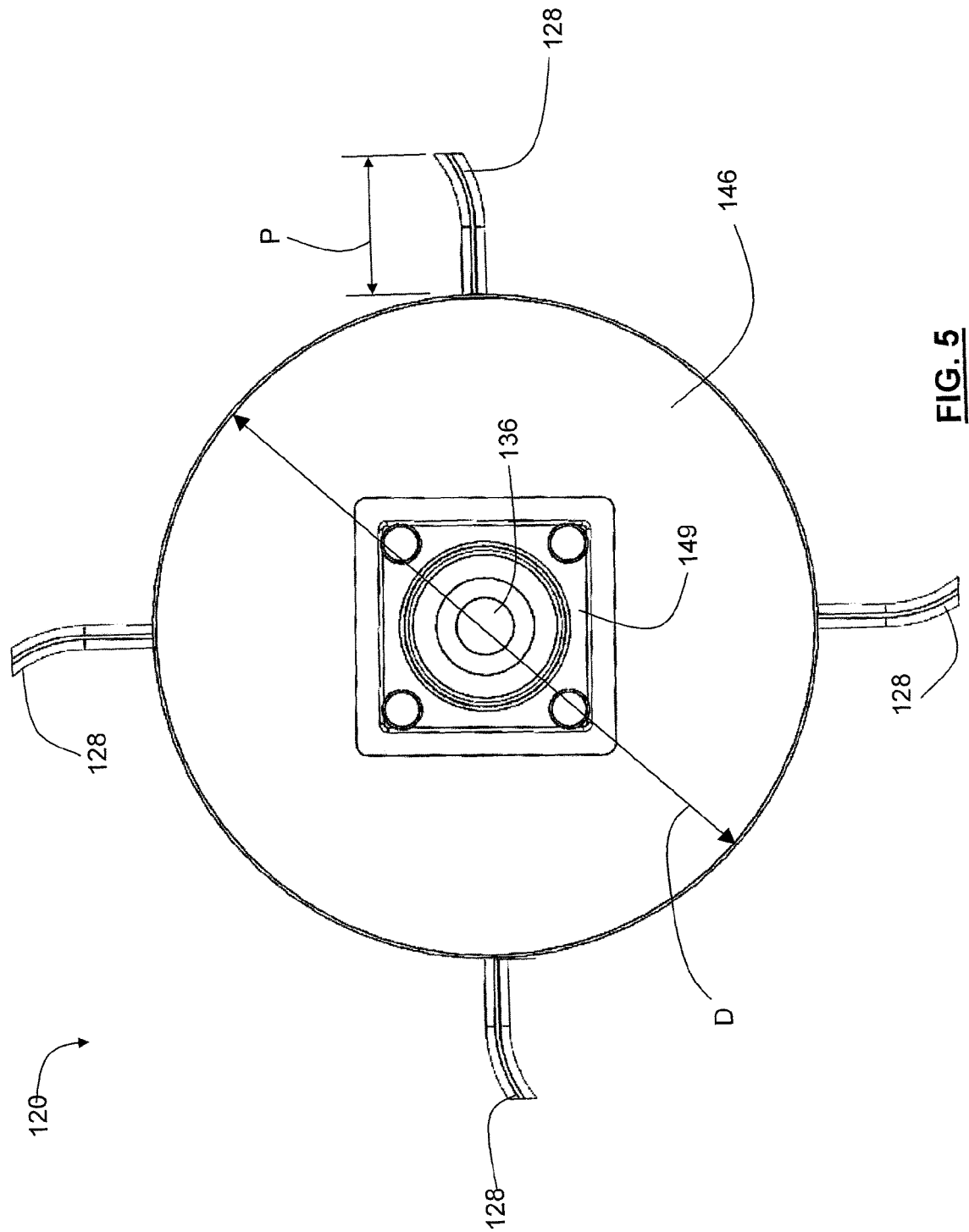
FIG. 5 is an end view of the shredding roller of FIG. 4.

Turning now to FIGS. 4 and 5, illustrated therein is a shredding roller 120 according to another embodiment. The shredding roller 120 is generally similar to the shredding roller 20, and like elements are given like numbers incremented by 100.

The shredding roller 120 includes first and second conveying sections 122, 124 that are configured to convey incoming bale material longitudinally towards a separating section 126 located therebetween.

As shown, the separating section 126 includes a plurality of flail members 128 that are pivotally coupled to a roller body 132, which in turn is rigidly coupled to a shaft 136 using coupling members 149.

Each conveying section 122, 124 includes a conveying member 138, 140 that is generally auger-shaped, with each conveying member 138, 140 including a pair of helical flights 141, 143 configured to wrap around the roller body 132. However, the helical flights 141, 143 in this embodiment are generally continuous with the roller body 132, and do not include openings or spaces between the helical flights 141, 143 and the roller body 132 (like the spaces 42, 44 provided in the shredding roller 20 described above). This may provide for smoother movement of the bale material along the helical flights 141, 143 towards the separating section 126.

The shredding roller 120 also includes end plates 146, 148 provided at opposite ends thereof. In this embodiment, the end plates 146, 148 flare outwardly (e.g. away from the separating section 126) as they extend radially away from the roller body 132. This flare or taper may help to guide incoming bale material inwardly towards the separating section 126.

Returning now to FIGS. 1 and 6, the operation of the bale processor 10 will be described in further detail. As shown, the feed portion 14 of the bale processor 10 generally includes a deck 50 or other support surface for receiving the bales of crop material thereon.

Extending upwardly from the deck 50 is a feed mechanism such as a movable barrier 52 that may be extended inwardly towards the separator portion 12 (generally perpendicular to the axis of rotation A) so as to push or urge a bale on the deck 50 into the shredding roller 20. Once the shredding roller 20 has separated the crop material from a particular bale, the movable barrier 52 can be retracted to allow another bale to be placed on the deck 50.

In some embodiments, a guide frame 54 may extend upwardly along one side of the deck 50. The guide frame 54 may help to retain the bale of crop material on the deck 50 and/or guide the movement of the bale when the moving barrier 52 is pushing the bale into the shredding roller 20.

In some embodiments, one or more fork members 56 (in this example two fork members 56) may be coupled to the deck 50 generally opposite the guide frame 54. The fork members 56 may be pivotally coupled to the deck 50 so that they can be raised and lowered to lift bales of crop material onto the deck 50. When not in use, the fork members 56 may be secured in a generally vertical orientation (as shown in FIG. 1) so as to help retain and/or guide the bale on the deck 50.

In some examples, the fork members 56 may be hydraulically coupled to a power source on a working vehicle for effecting movement of the fork members 56.

During use of the bale processor 10, a bale can be placed onto the deck using the forks 56 with the movable barrier 52 in the retracted position. The movable barrier 52 is then moved inwardly, towards the separator portion 12, pushing or urge the bale on the deck 50 into the shredding roller 20 while the shredding roller 20 is being rotated by the drive mechanism 37.

As the bale makes first contact with the shredding roller 20, the flails 28 will engage an inner region of the bale and begin to separate the crop material therefrom. As the bale continues to advance, the outer portions of bale will begin to engage the conveying members 38, 40. The conveying members 38, 40 will then convey those outer portions longitudinally inwardly towards the flails 28 so they can be separated from the rest of the bale.

The use of the conveying members 38, 40 with the flails 28 tends to ensure a more even feed of material through the shredding roller 20. In particular, even when an entire "flake" of crop material is grabbed at once, portions of the bale will tend to remain in contact with the conveying members 38, 40, and thus will continue to be fed to the flails 28 evenly. This tends to smooth out the jerky or uneven feed of crop material that is problematic in prior known bale processors.

In some embodiments, other suitable feed mechanisms may be used to move the bale into the shredding roller 20 without the moving barrier 52. For example, the deck 50 or support surface may include a belt conveyor or powered rollers that can push the bale into the shredding roller 20.

As shown in FIG. 1, the bale processor 10 may also include one or more paddle rollers 60, 62 provided in the upper frame portion 18. In some embodiments, the paddle rollers 60, 62 may be driven (e.g. using a drive mechanism 61). In other embodiments, the paddle rollers 60, 62 may be freely rotating.

The paddle rollers 60, 62 are generally configured to engage the upper portion of the incoming bales and to help direct those portions downwardly towards the shredding roller 20. In particular, it is typical for a bale to be taller than the height of the shredding roller 20 (e.g. the bale has a height above the deck 50 greater than the diameter D of the conveying sections 22, 24 and the distance P). Accordingly, the paddle rollers 60, 62 can help ensure that the upper portion of each bale is fed to the shredding roller 20.

As shown in FIG. 6, the conveying sections 22, 24 may be partially enclosed with cowling or shrouds 72, 74 generally opposite the feed portion 14. Each shroud 72 74 has a generally arcuate shape that corresponds to the outer profile of each conveying section 22, 24. The shrouds 72, 74 tend to inhibit bale material from collecting or becoming jammed behind the shredding roller 20 and ensure that the bale material moves smoothly from the conveying sections 22, 24 to the separating section 26. In some cases, the shrouds 72, 74 may be covered or hidden by panels 78 (as shown for the shroud 72).

The bale processor 10 also includes a discharge chute 76 generally aligned with the separating section 26. The discharge chute 76 is configured to receive the separated crop material leaving the separating section 26 of the shredding roller 20 and may direct the separated crop material outwardly away from the bale processor 10.

In some embodiments, the separated crop material may be deposited on the ground beside the bale processor 10, leaving the discharge chute 76 without further manipulation. However, in other embodiments, the discharge chute 76 can be coupled to one or more chute members (not shown) that may be used to direct the movement of the separated crop material leaving the shredding roller 20. For example, an adjustable distribution chute (not shown) may be used to allow the separated crop material to be directed for various uses, such as raising the height of the discharged bale material to bed livestock in paddocks, or focusing the discharged bale material into a particular area to form a windrow.

The conveying sections 22, 24 move crop material from the outer portions of the bale into the separating section 26, thus funneling or focusing a large volume of material (e.g. generally proportionate to the length L of the shredding roller 20) through a much smaller area (e.g. generally proportionate to the length of the separating section 26). As a result, the separated crop material tends to acquire greater velocities when being discharged by the bale processor 10 (as opposed to the velocity of crop material being discharged from known bale processors).

Accordingly, the discharged crop material can be thrown a great distance from the bale processor 10 (e.g. in some cases greater than twenty feet and even up to sixty feet or more) using chutes coupled to the discharge chute 76.

In some embodiments, the bale processor 10 may be provided with wheels (not shown) such that it can be towed or pulled by a tractor or another working vehicle. Alternatively, in other embodiments, the bale processor 10 may be mountable onto a working vehicle such as a skid steer loader using an attachment mechanism 80 (e.g. an attachment plate).

While the above description provides examples of one or more methods and/or apparatuses, it will be appreciated that other methods and/or apparatuses may be within the scope of the present description as interpreted by one of skill in the art.

The invention claimed is:

1. A bale processor, comprising:
   a. a support surface for supporting a bale of crop material;
   b. a shredding roller positioned at one end of the support surface, the shredding roller having an elongate roller body, the roller body configured to rotate about an axis of rotation; and
   c. a feed mechanism positioned on the support surface, the feed mechanism configured for urging the bale towards the shredding roller along a direction perpendicular to the axis of rotation of the roller body;
   d. wherein the shredding roller includes:
      i. at least one separating section having at least one impacting member that protrudes outwardly from the elongate roller body, the at least one impacting member configured to impact the bale when the roller body rotates so as to separate the crop material therefrom; and
      ii. a first and second conveying section, each conveying section having at least one auger-shaped conveying member with at least one generally helical flight that wraps around the roller body;
      iii. wherein the separating section is located between the first and second conveying sections, and the first and second conveying sections are configured to engage outer portions of the bale and to direct those outer portions of the bale towards the flails of the separating section in a longitudinal direction aligned with the axis of rotation of the roller body;
   e. wherein the at least one impacting member comprises a plurality of flails, each flail pivotally coupled to the elongate roller body and extending outwardly from the roller body beyond a diameter of the at least one conveying section by a distance selected so that the plurality of flails cause separation of the crop material from a central portion of the bale allowing the outer portions of the bale to be pushed inwardly by the conveying sections towards the flails; and
   f. a discharge chute aligned with the at least one separating section, the discharge chute configured to receive the separated crop material from the shredding roller and to direct the separated crop material.

2. The bale processor of claim 1, wherein each helical flight is spaced apart from the roller body so as to define a space therebetween.

3. The bale processor of claim 1, wherein each helical flight is generally continuous with the roller body so that no spaces are defined therebetween.

4. The bale processor of claim 1, wherein each conveying section is at least partially enclosed by a shroud generally opposite the feed mechanism, each shroud having an arcuate shape corresponding to the outer profile of each conveying section.

5. The bale processor of claim 1, wherein the feed mechanism comprises a movable barrier that extends upwardly from the support surface.

6. The bale processor of claim 1, further comprising end portions that extend outwardly from the opposite ends of the shredding roller.

7. The bale processor of claim 6, wherein the end portions are tapered.

8. The bale processor of claim 1, further comprising at least one paddle roller configured to direct an upper portion of each bale downwardly towards the shredding roller.

9. The bale processor of claim 1, wherein the selected distance is greater than three inches.

10. The bale processor of claim 1, wherein the selected distance is between one inch and three inches.

11. A shredding roller for use with a bale processor, comprising:
    a. an elongate roller body configured to rotate about an axis of rotation;
    b. at least one separating section having at least one impacting member that extends outwardly from the roller body and being configured to impact a bale of crop material when the roller body is rotated so as to separate the crop material therefrom; and
    c. at least one conveying section, each conveying section having at least one auger-shaped conveying member with at least one generally helical flight that wraps around the roller body and being configured to engage a first portion of the bale and to direct that first portion of the bale towards the separating section in a longitudinal direction aligned with the axis of rotation of the roller body;
    d. wherein the at least one impacting member comprises a plurality of flails, each flail pivotally coupled to the elongate roller body and extending outwardly from the roller body beyond a diameter of the at least one conveying section by a distance selected so that the plurality of flails cause separation of the crop material from a second portion of the bale allowing the first portion of the bale to be pushed by the conveying sections towards the flails.

12. The shredding roller of claim 11, wherein each helical flight is spaced apart from the roller body so as to define a space therebetween.

13. The shredding roller of claim 11, wherein
    a. the at least one conveying section includes a first conveying section located at a first end of the shredding roller and a second conveying section located at a second end of the shredding roller;
    b. the separating section is located between the first and second conveying sections; and
    c. the first and second conveying sections are configured to convey bale material longitudinally inwardly towards the separating section.

14. The shredding roller of claim 11, wherein each conveying section is configured to be at least partially enclosed by a shroud, each shroud having an arcuate shape corresponding to the outer profile of each conveying section.

15. The shredding roller of claim 11, wherein the selected distance is greater than three inches.

16. The shredding roller of claim 11, wherein the selected distance is between one inch and three inches.

17. A bale processor, comprising:
    a. a support surface for supporting a bale of crop material;
    b. a shredding roller positioned at one end of the support surface, the shredding roller having an elongate roller body, the roller body configured to rotate about an axis of rotation; and
    c. a feed mechanism positioned on the support surface, the feed mechanism configured for urging the bale towards the shredding roller;
    d. wherein the shredding roller includes:
        i. at least one separating section having at least one impacting member that protrudes outwardly from the elongate roller body, the at least one impacting member configured to impact the bale when the roller body rotates so as to separate the crop material therefrom; and
        ii. at least one conveying section, each conveying section configured to engage a first portion of the bale and to direct that first portion towards the separating section in a longitudinal direction aligned with the axis of rotation of the roller body;
    e. wherein the at least one impacting member comprises a plurality of flails, each flail pivotally coupled to the elongate roller body and extending outwardly from the roller body beyond a diameter of the at least one conveying section by a distance selected so that the plurality of flails cause separation of the crop material from a second portion of the bale allowing the first portion of the bale to be pushed by the conveying sections towards the flails.

18. The bale processor of claim 17, wherein the selected distance is greater than three inches.

19. The bale processor of claim 17, wherein the selected distance is between one inch and three inches.

20. The bale processor of claim 17, wherein the at least one conveying section includes a first conveying section and a second conveying section, and wherein the separating section is located between the first and second conveying sections and the first and second conveying sections are configured to convey crop material from the bale longitudinally inwardly towards the flails as the roller body rotates.

* * * * *